United States Patent
Jin et al.

(10) Patent No.: US 9,112,714 B2
(45) Date of Patent: Aug. 18, 2015

(54) HEADER COMPRESSION ENHANCEMENT FOR BROADCAST/MULTICAST SERVICES

(75) Inventors: Haipeng Jin, San Diego, CA (US); Jun Wang, La Jolla, CA (US); Raymond Tah-Sheng Hsu, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 12/757,733

(22) Filed: Apr. 9, 2010

(65) Prior Publication Data

US 2011/0182226 A1 Jul. 28, 2011

Related U.S. Application Data

(62) Division of application No. 10/833,547, filed on Apr. 27, 2004, now Pat. No. 7,822,067.

(60) Provisional application No. 60/493,881, filed on Aug. 8, 2003.

(51) Int. Cl.
*H04H 20/71* (2008.01)
*H04L 12/18* (2006.01)
(Continued)

(52) U.S. Cl.
CPC ............ *H04L 12/1877* (2013.01); *H04L 69/04* (2013.01); *H04W 28/06* (2013.01); *H04L 12/189* (2013.01); *H04W 72/005* (2013.01)

(58) Field of Classification Search
CPC ....... H04W 84/18; H04W 84/12; H04W 4/06; H04W 80/04; H04W 88/06; H04W 88/08; H04W 74/08; H04W 8/26; H04W 28/06; H04W 72/005; H04L 29/0653; H04L 2012/5652; H04L 12/1877; H04L 69/04; H04L 12/189; H04J 3/076
USPC ................. 370/338, 442, 310–312, 328, 349, 370/471–474; 455/7; 709/222
See application file for complete search history.

(56) References Cited

U.S. PATENT DOCUMENTS 6,058,106 A  5/2000  Cudak et al.
6,618,397 B1 * 9/2003  Huang ........................... 370/474
(Continued)

FOREIGN PATENT DOCUMENTS

EP      1283617      2/2003
JP    2001320422 A   11/2001
(Continued)

OTHER PUBLICATIONS

C. Borman, et al., "Robust Header Compression (RoHC); Framework and four profiles: RTP, UDP, ESP and uncompressed" Internet Engineering Task Force, (RFC) 3095, Jul. 2001, pp. 1-168.
(Continued)

*Primary Examiner* — Kwang B Yao
*Assistant Examiner* — Syed M Bokhari
(74) *Attorney, Agent, or Firm* — Charles E. Eggers (57) ABSTRACT

Methods and apparatus for compression of headers in broadcasting BCMCS services in a wireless communication system are described. Techniques used in BCMCS systems without feedback include sending static context information during BCMCS service initialization for use in a decompressor in a mobile station. Techniques used in BCMCS systems with feedback include receiving feedback from distributed mobile station decompressors and adjusting the broadcasting compressor in response to the feedback. Techniques that reduce the number of operating states in both the compressor and the decompressor are described. Techniques to classify flows so that a reduced number of contexts are used to compress/decompress session packet headers in a push-to-talk service are described.

32 Claims, 9 Drawing Sheets

(51) Int. Cl.
*H04W 28/06* (2009.01)
*H04L 29/06* (2006.01)
*H04W 72/00* (2009.01)

(56) References Cited

U.S. PATENT DOCUMENTS

| | | | |
|---|---|---|---|
| 6,909,702 B2 | 6/2005 | Leung et al. | |
| 7,042,865 B1* | 5/2006 | Meier et al. | 370/338 |
| 7,046,672 B2 | 5/2006 | Liao et al. | |
| 7,643,456 B2* | 1/2010 | Jouppi et al. | 370/338 |
| 7,693,508 B2 | 4/2010 | Leung et al. | |
| 7,697,523 B2 | 4/2010 | Leung et al. | |
| 7,822,067 B2 | 10/2010 | Jin et al. | |
| 2001/0036823 A1 | 11/2001 | Van Lieshout et al. | |
| 2001/0046866 A1 | 11/2001 | Wang | |
| 2002/0097701 A1 | 7/2002 | Lupien et al. | |
| 2002/0102999 A1 | 8/2002 | Maggenti et al. | |
| 2002/0141365 A1 | 10/2002 | Leung | |
| 2002/0142730 A1 | 10/2002 | Hsu | |
| 2002/0146000 A1 | 10/2002 | Jonsson et al. | |
| 2002/0150091 A1 | 10/2002 | Lopponen et al. | |
| 2003/0012149 A1 | 1/2003 | Maggenti et al. | |
| 2003/0054807 A1 | 3/2003 | Hsu et al. | |
| 2003/0162495 A1* | 8/2003 | Yonemoto et al. | 455/7 |
| 2003/0225914 A1* | 12/2003 | Gazier et al. | 709/247 |
| 2010/0208745 A1* | 8/2010 | Haran et al. | 370/442 |
| 2011/0194481 A1* | 8/2011 | Chow et al. | 370/312 |
| 2011/0208845 A1* | 8/2011 | Droms et al. | 709/222 |

FOREIGN PATENT DOCUMENTS

| | | |
|---|---|---|
| JP | 2002290383 A | 10/2002 |
| JP | 2003511981 A | 3/2003 |
| JP | 2003143158 A | 5/2003 |
| JP | 2005509310 | 4/2005 |
| JP | 2005509311 A | 4/2005 |
| TW | 359923 | 6/1999 |
| TW | 365733 | 8/1999 |
| TW | 399375 | 7/2000 |
| TW | 402854 | 8/2000 |
| TW | 420910 | 2/2001 |
| WO | WO-0128180 A2 | 4/2001 |
| WO | WO0193068 A2 | 12/2001 |
| WO | 02080488 | 10/2002 |
| WO | 02080490 A2 | 10/2002 |
| WO | WO03019840 | 3/2003 |
| WO | 03041424 A2 | 5/2003 |

OTHER PUBLICATIONS

International Search Report, PCT/US04/025568, International Search Authority, European Patent Office, Mar. 2, 2005.

Written Opinion, PCT/US04/025568, International Search Authority, European Patent Office, Mar. 2, 2005.

European Search Report—EP10009632—Search Authority—Munich—Oct. 19, 2011.

* cited by examiner

PRIOR ART

FIG. 3

PRIOR ART

HEADER COMPRESSION ENHANCEMENT FOR BROADCAST/MULTICAST SERVICES

CLAIM OF PRIORITY UNDER 35 U.S.C. §120

The present Application for Patent is a Divisional of patent application Ser. No. 10/833,547 entitled "Header Compression Enhancement For Broadcast/Multicast Services" filed Apr. 27, 2004 now U.S. Pat. No. 7,822,067, now allowed, which claims priority to U.S Application No. 60/493,881 filed Aug. 8, 2003 and assigned to the assignee hereof and hereby expressly incorporated by reference herein.

BACKGROUND

1. Field

The invention relates generally to wireless communication, and more specifically to header compression in broadcast and multicast services.

2. Background

Broadcast, or multicast services, refers a communication system used to transmit information from a transmitter to multiple receivers or users. Examples of broadcast, or point-to-multipoint communication systems include dispatch systems, such as used by police, trucking companies, and taxi companies where a central dispatcher broadcast signals to one or more vehicles. The signal may be directed to a specific vehicle or to all vehicles simultaneously.

As mobile radio networks have become commonplace, such as cellular telephone networks, customers have begun to desire to receive broadcast of video, and multimedia using Internet Protocol (IP) over a wireless communication link. For example, customers desire to be able to receive streaming video, such as television broadcast, on their cell phone or other portable wireless communication device. Other examples of the type of data that customers desire to receive with their wireless communication device include multimedia broadcast and Internet access.

A typical wireless communication channel has limited bandwidth and may experience significant error rates. Various techniques for transmitting messages according to broadcast and multicast services (BCMCS) have been developed. In general, these techniques include formatting the message data into packets with a header that includes information about the data within the packet. In BCMCS communications, a content provider, or content server, generates a data stream to be broadcast to multiple receivers, or users. The data stream is converted to data packets that include headers, comprising a BCMCS data stream that is then broadcast to multiple communication devices simultaneously. Due to the scarcity of radio resources, such as limited bandwidth, the packet data headers are usually compressed before being broadcast.

Header compression refers to the technique of minimizing the necessary bandwidth usage for information carried in headers of various packets: examples include RTP/UDP/IP and TCP/IP packets. Header compression takes advantage of the redundancies existing between consecutive packets within a given packet stream. For compressing the packet headers, a compressor may reside within a wireless network infrastructure such as in a Packet Data Serving Node (PDSN). The compressor receives an incoming BCMCS data stream from a content server, compresses the BCMCS data stream and then forwards the data stream with the compressed headers to a radio network. The compressed packets are then transmitted over a radio link broadcast channel to the designated wireless communication devices. The receiving wireless communication devices include a decompressor that receives the compressed packets as input and regenerates uncompressed packets to reconstruct the original data stream.

Most header compression schemes make use of the redundancies between consecutive packets by maintaining state information (context) at both the compressor and the decompressor. The static context information is sent only initially, while dynamic context is sent either as uncompressed values in dynamic context update headers to complete the context information, or as differences from packet to packet, usually encoded using efficient encoding algorithms. In order for the decompressor to regenerate the uncompressed packets correctly, the context in the decompressor needs to be synchronized to the context used by the compressor during compression. Techniques that have been developed to maintain synchronization of the context between the decompressor and compressor include the Robust Header Compression (ROHC) technique developed by the ROHC Working Group of the Internet Engineering Task Force, [see, for example the standards and drafts at the Internet URL www.ietf.org/rfc/rfc3095.txt?number=3095], incorporated in its entirety herein. While the ROHC protocol improves header compression for broadcast services, such as BCMCS, due to the limited bandwidth of the wireless communication channel further improvements in header compression are desirable.

There is therefore a need in the art for improving header compression techniques for broadcast and multicast services in a wireless communication system.

SUMMARY

Embodiments disclosed herein address the above stated needs by broadcasting in a wireless communication system and initializing a context for use in a decompressor in a mobile station. Following the initialization state, broadcasting involves operating a compressor thereafter in states in which the compressor updates the static and dynamic parameters of the decompressor until termination of the broadcast operation. For example, the compressor can operate in a First Order State wherein the compressor sends data packets that include dynamic and static parameters of the context or a Second Order State wherein the compressor sends data packets that include dynamic parameters of the context. The compressor then changes between the First Order and the Second Order without returning to the initialization state.

One aspect of the invention is that changing between operating states by the compressor occurs at periodic intervals. Other aspects include changing between compressor operating states in response to a change in the communication channel characteristic, in response to a request, or following a predetermined number of data transmissions.

Another aspect is that the compressor alternates between the first and second states at periodic intervals. Other aspects include the compressor alternating between the first and second states in response to a change in a communication channel characteristic, in response to a request, or following a predetermined number of data transmissions.

In yet another aspect, a decompressor performs a broadcast operation by receiving parameters for an initialization state that establishes an initialization context that that includes dynamic and static parameters. After establishing the initialization context the decompressor thereafter operates in a broadcast session in which the decompressor receives updates to the dynamic and static parameters of the decompressor until termination of the broadcast operation.

In another aspect, a decompressor includes an initialization state that creates an initial context using dynamic and static parameters established by a compressor. The decompressor also includes a first state that decompresses data using the dynamic and static parameters, and a second state that reestablishes the dynamic parameters for use in decompression. Following initialization, the decompressor may alternate between the first and second states in a predetermined manner. Likewise, the decompressor may enter and then remain in either the first or the second state. An additional aspect is that the decompressor can alternate between the first and second states based on errors during decompression.

In another aspect, multiple distributed decompressors are communicating with the compressor, where feedbacks are sent from all or some of the decompressors to the compressor. Based on the group of feedbacks received, the compressor adjusts compression state and compression level.

In a further aspect, when multicasting wireless communication between a group of users, such as with Push-To-Talk services, a destination address in a data stream is examined to determine if it includes a multicast address. If so, then the data stream is classified based on the destination address and other parameters within the data stream, and a single context for the multicast session is established. Other aspects include the classification of the data stream based on a destination port, an IP version, or an IP protocol field.

Other features and advantages of the present invention should be apparent from the following description of exemplary embodiments, which illustrate, by way of example, aspects of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
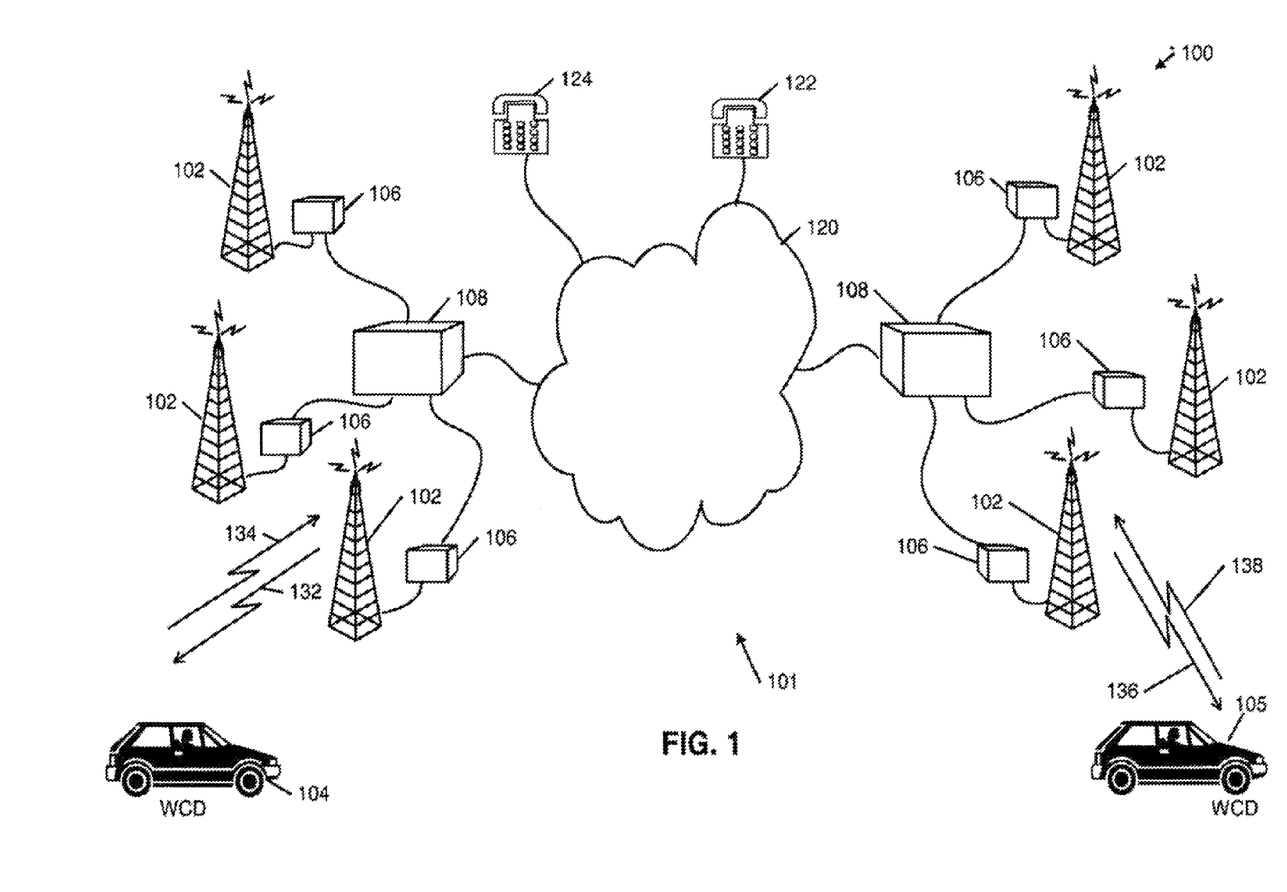
FIG. 1 shows portions of a communication system 100 constructed in accordance with the present invention.

Techniques to enhance header compression for BCMCS services in a wireless communication system are described. In BCMCS systems without feedback, static context information can be sent during BCMCS service initialization for use in a decompressor in a WCD, or mobile station. Enhancements include reducing the number of operating states in both a compressor and a decompressor used in the BCMCS service. In addition, both header compression efficiency and robustness can be increased. Also described are techniques that provide feedback from a group of distributed WCD, or mobile station, decompressors to the broadcasting compressor and as well as mechanisms for the compressor, based on the feedback, to adjust compression to achieve both efficiency and robustness. Also described are techniques for PTT type service that classify flows so that a reduced number of contexts can be used to compress/decompress PTT session packet headers even for a large group of users, thereby saving resources in both the PDSN and the mobile station FIG. 1 shows portions of a communication system 100 constructed in accordance with the present invention. The communication system 100 includes infrastructure 101, multiple wireless communication devices (WCD) or mobile stations (MS) 104 and 105, and landline communication devices 122 and 124. In general, WCDs may be either mobile or fixed.

The infrastructure lot also includes other components, such as base stations 102, base station controllers 106, mobile switching centers 108, a switching network 120, and the like. In one embodiment, the base station 102 is integrated with the base station controller 106, and in other embodiments the base station 102 and the base station controller 106 are separate components. Different types of switching networks 120 may be used to route signals in the communication system 100, for example, the switching network 120 may be the public switched telephone network (PSTN).

The term "forward link" refers to the signal path from the infrastructure to a WCD, and the term "reverse link" refers to the signal path from a WCD to the infrastructure. As shown in FIG. 1, WCDs 104 and 105 receive signals 132 and 136 on the forward link and transmit signals 134 and 138 on the reverse link. In general, signals transmitted from a WCD 104 and 105 are intended for reception at another communication device, such as another remote unit, or a landline communication device 122 and 124, and are routed through the switching network 120. For example, if the signal 134 transmitted from an initiating WCD 104 is intended to be received by a destination WCD 105, the signal is routed through the infrastructure and a signal 136 is transmitted on the forward link to the destination WCD 105. Typically, a communication device, such as a WCD or a landline communication device, may be both an initiator of and a destination for the signals.

Examples of WCDs 104 include cellular telephones, wireless communication enabled personal computers, and personal digital assistants (PDA), and other wireless devices. The communication system 100 may be designed to support one or more wireless standards. For example, the standards may include standards referred to as TIA/EIA-95-B (IS-95), TIA/EIA-98-C (IS-98), cdma2000, Wideband CDMA (WCDMA), and others.

Figure 2:
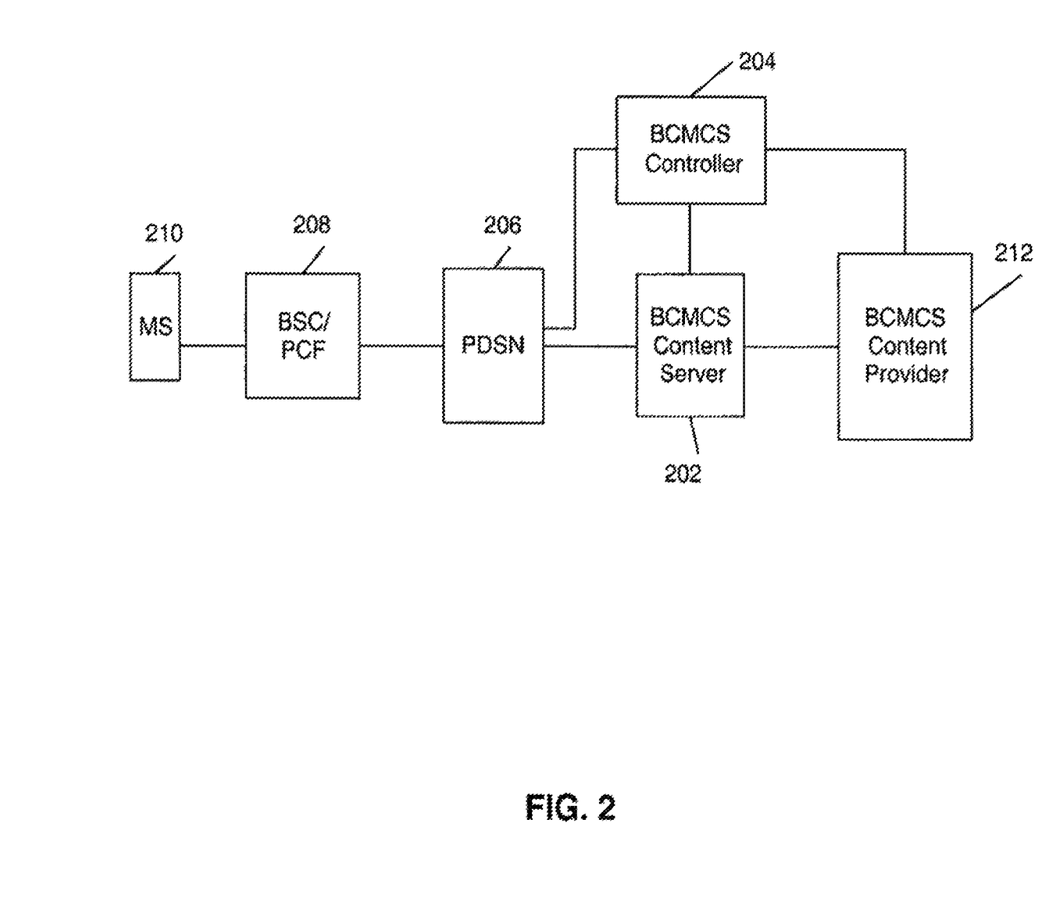
FIG. 2 illustrates an exemplary wireless network that can deliver BCMCS content stream in accordance with the invention.

FIG. 2 illustrates components of an exemplary wireless network that can deliver BCMCS content stream through a system such as illustrated in FIG. 1. As shown in FIG. 2, the wireless network infrastructure can include a BCMCS content server 202, a BCMCS controller 204, a Packet Data Service Node (PDSN) 206, Base Station Controller/Packet Control Function (BSC/PCF) 208 and subscribing WCDs, such as mobile stations (MS) 210. In general, the BCMCS controller 204 is responsible for managing and providing the BCMCS session information to the PDSN 206, the MS 210, and the BCMCS content server 202. The BCMCS content originates from a BCMCS content provider 212 and goes through the BCMCS content server 202, which then makes the content available within a multicast IP stream. The BCMCS content server 202 typically communicates to the PDSN 206 and the PDSN 206 sends the multicast IP flow to the BSC/PCF 208, which chooses a type of radio channel (usually shared radio channel) and transmits the multicast IP flow over the selected radio channel. The MS 210 receives the desired flow carried over the radio channel.

In a wireless communication system, due to the limited bandwidth available, it is desirable to decrease the bandwidth needed to transmit signals. In BCMCS, as well as other broadcast services where data packets that include headers are transmitted, compressing header information can decrease the bandwidth needed for transmission of the signal. Header compression refers to techniques of minimizing the necessary bandwidth usage for information carried in headers of various packets, for example, Real Time Protocol/User Datagram Protocol/Internet Protocol (RTP/UDP/IP) and Transmission Control Protocol/Internet Protocol (TCP/IP) packets. Header compression takes advantage of redundancies that exist between consecutive packets within a given packet stream. Typically, header compression techniques make use of these redundancies by maintaining state information, or context, at both the compressor and the decompressor. Static context information is sent only initially, while dynamic context is sent either as uncompressed values in dynamic context update headers to complete the context information or as differences from packet to packet, usually encoded using efficient encoding algorithms.

In an exemplary embodiment, header compression of the IP flow may be performed by a compressor at the PDSN 206. Header compression reduces the amount of data that has to be broadcast and thereby helps to conserve radio resources. A decompressor in each MS 210 decompresses the packets with compressed headers and regenerates the transmitted IP packets.

Unidirectional ROHC

One of the existing BCMCS service modes of operation is a unidirectional mode where there is no return path from the decompressor to the compressor. The unidirectional mode of operation using ROHC can encounter difficulties when used over broadcast links with significant error rates and limited, or scarce, bandwidth.

In ROHC, because there is no return path available from the decompressor to the compressor, a technique referred to as Uni-directional mode (U mode) is used to perform header compression. In U mode there are three compressor states during operation, an Initialization and Refresh (IR) state, a First Order (FO) state, and a Second Order (SO) state.

Figure 3:
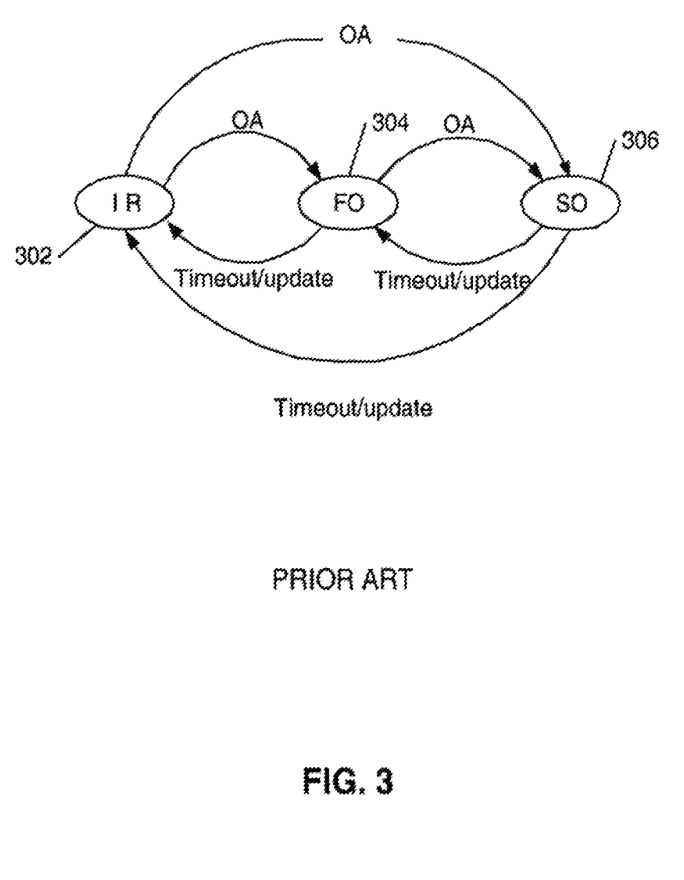
FIG. 3 illustrates a state diagram for the three states used for ROHC compression in U mode for a conventional system.

FIG. 3 illustrates a state diagram for the three states used for ROHC compression in U mode for a conventional system. As illustrated in FIG. 3, a compressor starts operation during a broadcast session in IR state 302. It is desirable for the compressor to transit to higher compression states FO 304 and SO 306 so that less bandwidth is required to successfully transmit messages between a compressor and a decompressor. In the IR state 302 a header that includes the complete context is output from the compressor for transmission. For example, at the beginning of a session the compressor will be in the IR state 302 and output a message with the complete context that can be used to initialize a decompressor. If a session is already underway and the decompressor had previously been initialized, the IR state 302 refreshes the decompressor by reestablishing all, or part, of the context. Data packets that include header information to initialize and refresh the context are typically referred to as IR packets.

As shown in FIG. 3, in normal operation during a session, the compressor can change from the IR state 302 to either the FO state 304 or the SO state 306. In the FO and SO states, less than a complete context is output by the compressor. The complete context may not need to be sent in each data packet because portions of the context may be static, not changing from the previous data packet, or any changes in the context may be predictable. If a portion of the context does not change, or if it changes in a predictable manner between two data packets, then the compressor can use the context values from the previous message, or change the values as predicted, to decompress the present message.

For example, the compressor can enter the SO state 306 when the header to be compressed does not change or is completely predictable. An example of a predictable change is the RTP sequence number, which is incremented by one for each packet sent. The compressor can enter the FO state 304 when headers in a packet do not conform to their previous pattern, in other words, some of the context changes in an unpredictable manner. In the FO state 304 the compressor sends information about dynamic fields that change in manners that cannot be predicted, and the information sent is usually compressed.

In U mode, the decision of when to transit between compression states is based on three principles: an optimistic approach, timeouts, and the need for update. Using the optimistic approach, transition to a higher compression state, such as from the IR state to the FO or SO states, is carried out when the compressor is fairly confident, or optimistic, that the decompressor has received enough information to correctly decompress packets according to the higher compression state. For example, the compressor stays in the IR state 304 until it assumes that the decompressor has received the static context information. After it has been decided that the decompressor has received the static context information the compressor will transit to either the FO or SO state, 304 or 306 respectively, depending on whether headers in a packet conform to their previous pattern or not.

Similarly, if the compressor is in the FO state 302 it can transit to the SO state 306 after it has confidence that the decompressor has all parameters needed to decompress according to a fixed pattern. The compressor normally obtains its confidence about decompressor status by sending several packets with the same information according to the lower compression state.

To protect against decompressor failures, the compressor must periodically transit to lower compression states to refresh the decompressor. Periodic transition from the FO or SO states, 304 or 306 respectively, to the IR state 302 should be carried out less often than transition from the SO state 306 to the FO state 304. The compressor must also immediately transit back to the FO state 302 when the header to be compressed does not conform to the established pattern.

For example, the compressor may transit from the SO state to the FO state, or from the FO state to the IR state, after a predetermined period. Likewise the compressor may transit from the SO state to the IR state after a predetermined period. Typically, the compressor will transit from the SO state to the FO state more frequently that the compressor will transit from the FO state to the IR sate or from the SO state to the IR state.

Figure 4:
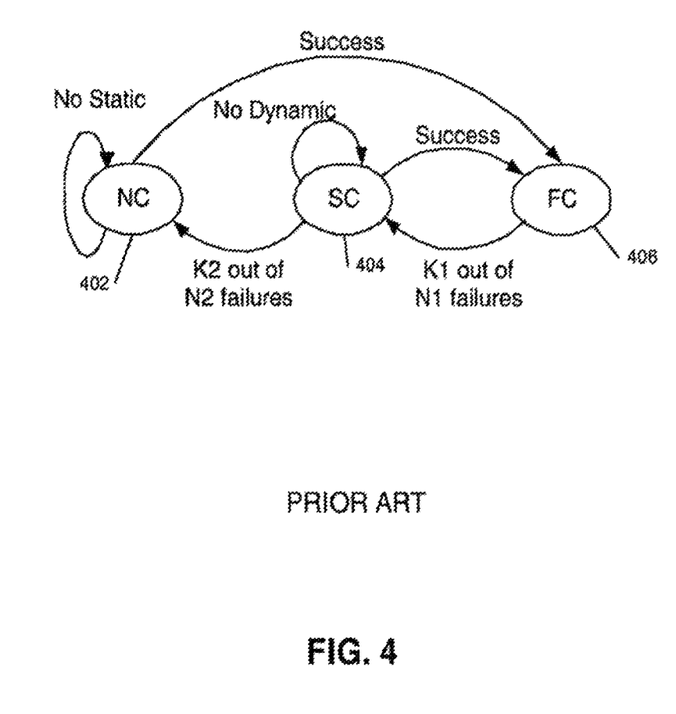
FIG. 4 illustrates a state diagram for the three states used for ROHC decompression in U-mode in a conventional system.

FIG. 4 illustrates a state diagram for the three states used for ROHC decompression in U-mode in a conventional system. As shown in FIG. 4, the decompressor starts in the lowest state, No Context (NC) state 402. Following a successful decompression, the decompressor will transit to the Full Context (FC) state 406. Repeated failed decompression will cause the decompressor to transit downwards to a lower state. Typically, the decompressor first transits from the FC state back to a Static Context (SC) state 404, where reception of any packet sent by the compressor carrying dynamic context information is normally sufficient to refresh the decompressor and enable a transition back to the FC state 406.

In the FC state 406, decompression may be attempted regardless of what kind of packet is received. In other words, in the FC state 406 decompression may be attempted when a received packet is sent by a compressor in any of the states, for example the IR, FO or SO states. In the NC state 402 only packets that have been compressed by the compressor in the IR state, which carry the static information fields, may be decompressed. Likewise, when in the SC state 404, only packets Carrying a 7- or 8-bit CRC can be decompressed (i.e., IR, IR-DYN, or Type 2 packets).

For example, a decompressor may transit from the FC state if errors in decompressing received data exceed a predetermined rate. Likewise, the decompressor may transit from the SC state to the NC state if errors in decompressing received data exceed a predetermined rate.

When used over error prone unidirectional links such as wireless broadcast links, the conventional ROHC U mode compression technique faces a very important tradeoff between efficiency and reliability. When the periodic transition to IR state in the compressor is set to a long interval, fewer large IR packets are transmitted, leading to higher bandwidth efficiency. However, because wireless links typically have a high error rate, it is highly probable that transmitted packets will be corrupted and cause repeated decompression failures at the decompressor. When the decompressor is in the NC state, either transitioning back to the NC state because of failed decompressions or failure to establish initial context, the decompressor may have to wait a lengthy period of time before the compressor periodically transmits a packet from the IR state, thereby re-establishing, or refreshing, the context in the decompressor. All packets received by the decompressor during this interval, which are not compressed by a compressor in the IR state, will be discarded, causing disruption in services. On the other hand, if the periodic transition to IR state in the compressor is set to happen with a short interval, the decompressor will be able to recover from context loss promptly and thus achieve higher reliability. However, the large number of IR packets sent will lead to much lower efficiency.

In addition, when a wireless communication device, or mobile station (MS), initially tunes into an over-the-air broadcast channel, for example during service discovery, the decompressor in the MS should be initialized "as soon as possible", in order to minimize the initial tuning time. The MS may also tune in and out of a broadcast channel. When a MS subsequently tunes back to a broadcast channel, the decompressor in the MS should be updated "as soon as possible", in order to minimize the re-tuning time. Again, there is tradeoff for sending frequent IR packets and the efficient use of the bandwidth of the wireless channel.

In accordance with the invention, a wireless communication system alleviates the dilemma in setting the periodic update period. For example, less information can be transmitted during periodic refresh while the decompressor can still recover from context damage quickly. Instead of using the IR packets sent during the IR state to establish and refresh the static context, an initial acquisition process between the compressor and the decompressor is used to convey the static information. The static information can be sent to the decompressor many different ways, such as:

1). Send the static information over a dedicated signaling channel when the MS acquires other session related information, for example, header compression algorithm, etc; or 2) Periodically send the static information on the over the air broadcast signaling channel.

Once the decompressor receives the static information, it can keep the information for the lifetime of the packet stream. In the event of context damage, the decompressor only needs to receive the dynamic information to re-establish the context because the static context does not change. As a result, the static context does not need to be sent again. Both the compressor states and decompressor states can be reduced to contain only two states.

Figure 5:
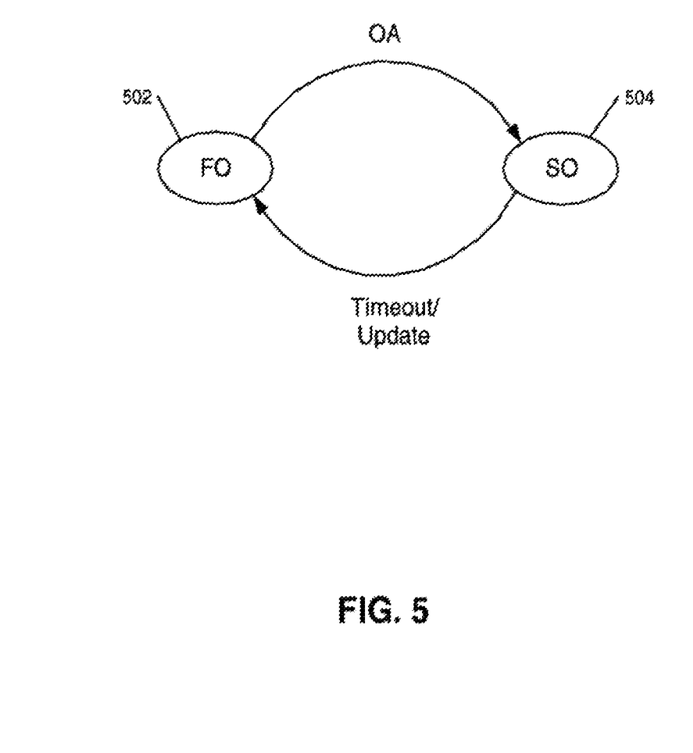
FIG. 5 illustrates a state diagram for ROHC compression in U mode for the system illustrated in FIG. 1 and FIG. 2, with only two states.

FIG. 5 illustrates a state diagram for ROHC compression in U mode for the system illustrated in FIG. 1 and FIG. 2, which operates with only two compression states. As shown in FIG. 5, following an initial acquisition process where the context for use in a decompressor is initialized, the compressor starts in a first order state referred to as the FO state 502. In the FO state 502 the compressor sends IR-DYN packets that contain the dynamic part of the context and other necessary information to establish the proper context in a decompressor. Once the compressor has confidence that the decompressor has established the proper context, for example, by following the optimistic approach principle, the compressor can transit to a second order state referred to as the SO state 504 and perform optimal compression. In one embodiment, to help the decompressor to quickly reach the FC by reducing the minimizing tuning or re-tuning time to recover from context damage, the compressor may periodically transit to FO state 502 to refresh the dynamic context.

In other words, in one embodiment, following initialization the compressor alternates between the first and second state in a predetermined manner. For example, the compressor can alternate between the first and second states periodically, or if there is a change in the communication channel's characteristics, or following a predetermined number of transmissions.

Figure 6:
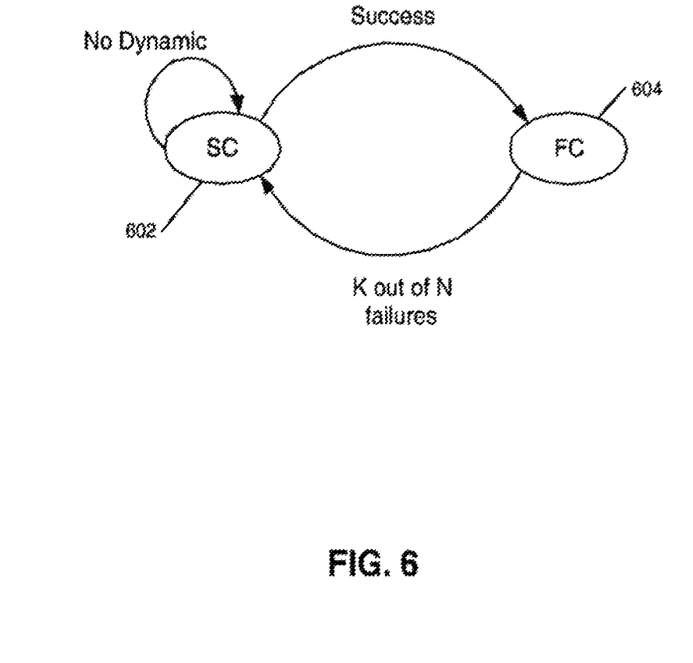
FIG. 6 illustrates a state diagram for ROHC decompression in U mode for the system illustrated in FIG. 1 and FIG. 2, with only two states.

FIG. 6 illustrates a state diagram for ROHC decompression in U mode for the system illustrated in FIG. 1 and FIG. 2, with only two states. As shown in FIG. 6, following an initial acquisition process that creates an initial context in the decompressor, the decompressor starts in a first state referred to as the SC state 602. In the SC state 602, the decompressor only attempts decompression packets carrying seven or eight bits CRC using the static context values established during initialization. Upon successful decompression, the decompressor transitions to a second state referred to as the FC state 604. The decompressor performs decompression attempts until repeated failures force it back to the SC state 602.

In other words, in one embodiment, following initialization the decompressor alternates between the first and second state in a predetermined manner. For example, the decompressor can alternate between the first and second states if there have been errors in the decompression process.

Figure 7:
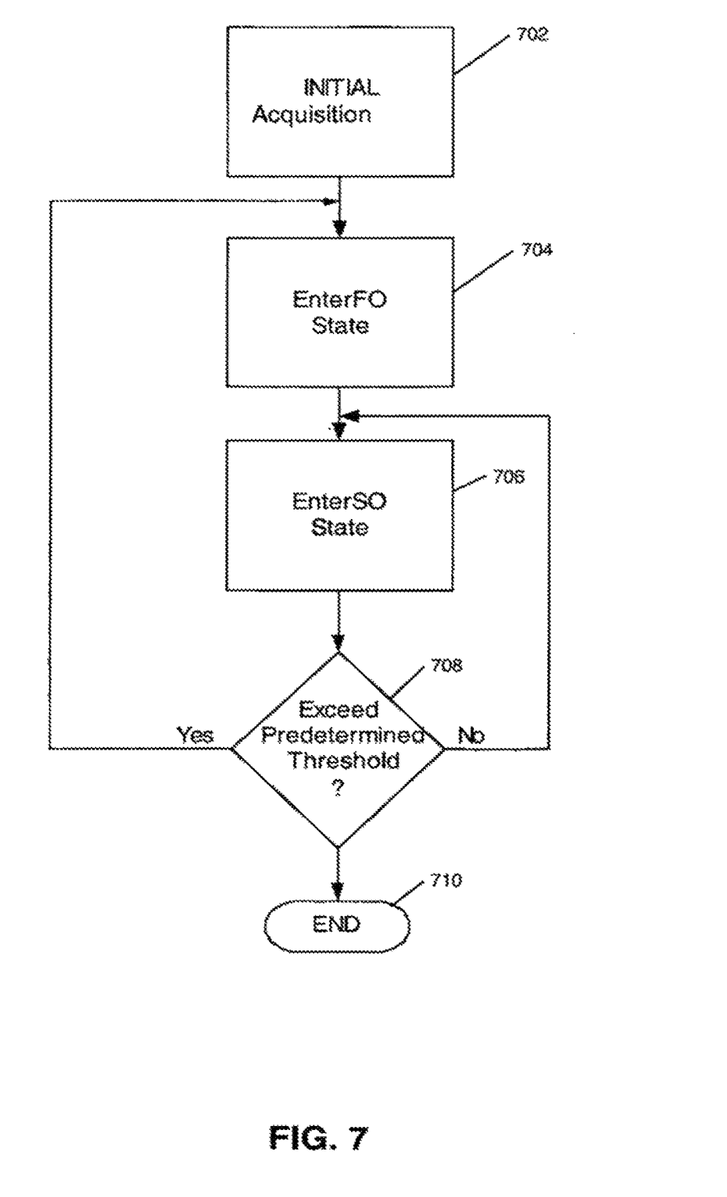
FIG. 7 is a flow diagram illustrating an exemplary embodiment of the compressor operation in the FIG. 5 system.

FIG. 7 is a flow diagram illustrating operation of an exemplary embodiment of the compressor in the FIG. 5 system. Flow begins in block 702 where the compressor and decompressors undergo an initialization process. For example, in one exemplary embodiment the initialization process includes sending context information from the compressor to the decompressor over a dedicated signaling channel. The information can include, for example, static information, a header compression algorithm and other session related information. In another exemplary embodiment the initialization process includes periodically sending the static information on an over the air broadcast signaling channel. Following the initialization process flow continues to block 704.

In block 704 the compressor enters a first order (FO) state. In one embodiment the compressor starts in the FO state. In the FO state the compressor sends less that the entire context to the decompressor. For example, in the FO state the compressor may send only the context related to dynamic and predictive values of the header compression to the decompressor. Because the decompressor has been initialized with static values there is no need to re-establish the static values because they do not change. After the compressor has confidence that the decompressor has established the proper context flow continues to block 706.

In block 706 the compressor enters a second order (SO) state. In the SO state the compressor sends less of the context than in the FO state to the decompressor. For example, in the SO state the compressor may send only the context related to dynamic values of the header compression to the decompressor. Because the decompressor has been initialized with static values, and has established the pattern of predictive values the compressor only needs to establish dynamic values of the compression context for the decompressor. Flow continues to block 708.

In block 708 the compressor checks if a predetermined threshold has been exceed. If the predetermined threshold has not been exceeded flow continues to block 706 and the compressor remains in the SO state. Returning to block 708, if the predetermined threshold has been exceeded then flow continues to block 704 and the compressor enters the FO state and re-establishes the decompressor context. The predetermined threshold in block 708 can be, for example, a number of data packets that have been sent, a period of time, or varied dependent on characteristics of the wireless channel such as the predicted error rate of the wireless channel. Flow continues until the BCMCS data stream is terminated when flow continues to block 710 and ends.

Figure 8:
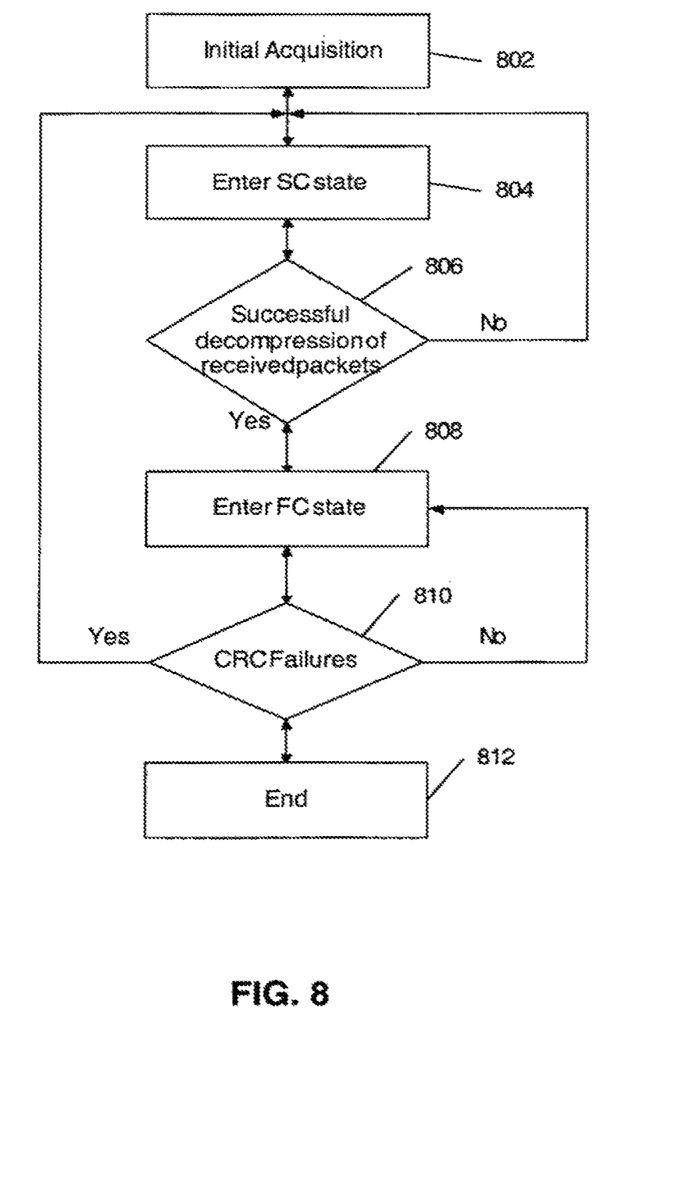
FIG. 8 is a flow diagram illustrating an exemplary embodiment of the decompressor operation in the FIG. 6 system.

FIG. 8 is a flow diagram illustrating operation of an exemplary embodiment of the decompressor in the FIG. 6 system. Flow begins in block 802 where the decompressor and compressors undergo an initialization process. For example, in one exemplary embodiment the initialization process includes sending context information from the compressor to the decompressor over a dedicated signaling channel. The information can include, for example, static information, a header compression algorithm and other session related information. In another exemplary embodiment the initialization process includes periodically sending the static information on an over-the-air broadcast signaling channel. Following the initialization process, flow continues to block 804.

In block 804 the decompressor enters a SC state. In the SC state the decompressor has established the static context. Flow then continues to block 806.

In block 806 it is determined whether a decompression attempt is successful. If the decompression is not successful, then flow continues to block 804 and the decompressor remains in the SC state. Returning to block 806, if the decompression is successful, then flow continues to block 808.

In block 808, the decompressor enters a FC state. In the FC state the decompressor has established all the context needed to decompress any compressed packets received from the compressor. Flow continues to block 810.

In block 810, it is determined whether errors, such as CRC failures, exceed a given rate. If not, then flow continues to block 808 and the decompressor stays in FC state. If CRC failures exceed a given rate, the flow continues to block 804 and the decompressor returns to SC state.

In block 804, when the decompressor receives a packet that has been sent by a compressor in the FO state, the packet will include information that is normally sufficient to refresh or re-establish the context in the decompressor, thereby enabling successful decompression and a transition by the decompressor back to the FC state.

Flow continues until the BCMCS data stream is terminated when flow continues to block 812 and ends.

Thus, improvements of header compression performance over wireless, error-prone, unidirectional links are achieved because the static context is transmitted to the decompressor reliably and only during the initial acquisition process. It is not necessary to periodically refresh the decompressor using large IR packets. Also, the compressor can periodically update the dynamic context at a higher rate, or frequency, thereby improving reliability while maintaining efficiency. Thus, when a new user joins a broadcast service, they are able to acquire the full context with a shorter delay. In addition, the decompressor can recover from context damage quickly because of the frequently sent dynamic context updates. So, in the event that the context in the decompressor is corrupted, or damaged, reception of an IR-DYN packet will refresh the decompressor so that it can begin to correctly decompress received packets.

ROHC with Feedback

Another mode of operation in BCMCS services is bi-directional mode. Bi-directional mode is a technique that includes a feedback provisioning and handling mechanism between a decompressor and a compressor in BCMCS. Because there is feedback, the decompressor in each MS is able to send various signals, or feedback messages, to the compressor thereby allowing the compressor to properly adjust the frequency and content of update headers sent to the decompressor to refresh, or synchronize, the context in the decompressor.

As discussed in ROHC U mode, the compressor can keep the context information at the decompressor updated by periodically sending context refreshing packets and/or sending context update packets upon request from the decompressor. In ROHC when there is feedback, there are generally three types of feedback messages used, including Acknowledgement (ACK), Negative Acknowledgement (NACK) and Static Negative Acknowledgement (STATIC-NACK). ACK indicates that the context at the decompressor is in synchronization with the context at the compressor and packets with compressed headers are decompressed correctly. NACK indicates that the dynamic context at the decompressor needs to be updated. STATIC-NACK indicates that the static context at the decompressor is out of synchronization. Different feedback messages cause different context update packets to be sent from the compressor to the decompressor.

FIG. 2 illustrates an exemplary wireless network that can deliver BCMCS content stream. In an exemplary embodiment, header compression of the IP flow may be performed by a compressor at the PDSN 206. Header compression reduces the amount of data that has to be broadcast and thereby helps to conserve radio resources. A decompressor in each WCD, or MS, 210 decompresses the packets with compressed headers and regenerates the transmitted IP packets.

In one example, to synchronize the context in the decompressor, each MS 210 initially receives the full context information from the BCMCS controller 204, or the PDSN 206, or partly from the BCMCS controller 204 and partly from the PDSN 206. The full context information enables the decompressor to correctly decompress the broadcast/multicast IP flow with compressed headers. During subsequent operation, the PDSN 206 may periodically send context refreshing packets helping the decompressor keep the context synchronized. Note that these periodic context refreshing packets may be full header packets or may be packets with only the dynamic context if the MSs 210 have the capability to store the static context information for the entire session once the static context is initialized.

A MS 210 sends negative feedback messages to the PDSN 206 when the decompressor detects an out-of-sync situation.

For example, the feedback message may contain a simple indication to the compressor that the decompressor has lost context synchronization. Alternatively, the feedback message may also indicate to the compressor whether only dynamic context has been damaged or static context has been damaged. For example, in ROHC the decompressor works in full context state most of the time. When there are k1 out of n1 decompression errors, the decompressor will send NACK and go to static context state. The NACK message prompts the compressor to update dynamic context. When the decompressor experiences k2 out of n2 decompression failures in the static context state, it will send STATIC_NACK and go to no context state. The STATIC_NACK message prompts the compressor to update both static and dynamic context. In many cases, the loss of static context also implies a need to update the dynamic context.

Optionally, each MS may also send positive feedback messages to the PDSN either periodically when decompression is successful or when decompression of certain critical packets is successful. A MS that experiences some decompression failures, but is able to avoid context damage using local repair mechanisms, will preferably send fewer positive feedback messages than a MS that can decompress all packets successfully.

In one exemplary embodiment, both positive and negative feedback messages contain the context ID. Based on the context ID, the broadcast PDSN 206 knows on which compression context actions should be performed. The feedback from each MS 210 to the PDSN 206 may be sent in either one of the following two methods.

First, the MS 210 may send feedback to the broadcast PDSN via over-the-air signaling and access-network signaling. For example, the feedback may be conveyed in an over-the-air signaling message from the MS to the BSC, and then an A9 signaling message from the BSC to the PCF, and then an A11 signaling message from the PCF to the PDSN. The network entities PDSN, PCF, and BSC are in the bearer path of the BCMCS content transmission.

Second, there may be cases in which the MS has an established Point-to-Point Protocol (PPP) session to a PDSN. The PDSN connected to the existing PPP session may or may not be the same broadcast PDSN that carries the broadcast/multicast IP flow. In either case, the MS can send the feedback messages over the PPP session with the BCMCS multicast address and/or flow ID included. If the PPP session is between the MS and the broadcast PDSN, the feedback messages will directly reach the broadcast PDSN which can then perform appropriate actions in response. If the PPP session is between the MS and a unicast PDSN different from the broadcast PDSN, the unicast PDSN may forward the feedback messages to the BCMCS controller, which then forwards the messages to the proper broadcast PDSN based on the BCMCS multicast address and/or flow ID. The unicast PDSN may also broadcast the feedback messages to all neighboring PDSNs. When the broadcast PDSN sees the broadcasted feedback message with matching BCMCS multicast address and/or flow ID, it will take actions accordingly. In the rare case that the MS knows the broadcast PDSN's address, the feedback messages can be directly addressed to the broadcast PDSN and routed via the unicast PDSN straightly to the broadcast PDSN.

Alternatively in the second method, the MS may send the feedback messages addressed to the BCMCS controller, regardless whether the PPP session is established with a unicast or broadcast PDSN; the BCMCS controller then forwards the messages to the appropriate broadcast PDSN. In addition to context ID, the MS also includes the BCMCS multicast address and/or flow ID in the feedback messages. Based on the multicast address and/or flow ID, the BCMCS controller would know which broadcast PDSN the feedback messages should be forwarded to.

The broadcast PDSN receives various feedback messages from the group of MSs that are served in its coverage area. Depending on the type and amount of feedback messages received, the PDSN takes different actions. For example, the PDSN may receive all positive feedback messages from the MS. If the PDSN is periodically sending context refreshing packets, it can decrease the refreshing frequency upon receiving positive feedback messages. The larger the amount of positive feedback messages, the lower the refreshing frequency can be and the faster the PDSN can decrease the frequency. If the PDSN is not sending out any periodic context refreshing packets originally, no further actions need to be taken.

Or, the receipt of negative feedback may prompt the PDSN to perform context refreshing. If the PDSN is enabled to send periodic context refreshing packets, it can increase the refreshing frequency upon receiving negative feedback. For example, the greater the amount of negative feedback, the higher the refreshing frequency and the faster the frequency is increased. If the number of negative feedback messages received is small, the PDSN may choose to send one or more consecutive context refreshing packets immediately without adjusting the periodic refreshing period (frequency). After the decompressors in the MSs recover from context damage, fewer or no negative feedback will be sent. The PDSN may also respond by reducing the refreshing frequency. This is especially necessary when no positive feedback is sent from the MSs to the PDSN.

Also, if the PDSN does not send periodic context refreshing packets at all (e.g. the compressor does not have the periodic update feature), it will respond to the negative feedback by sending one or more consecutive context refreshing packets. For example, the greater the amount of negative feedback, the greater the number of consecutive context refreshing packets that will be sent. When the MSs that experience context damage re-establish their contexts, fewer or no negative feedback will be sent. The PDSN can, in turn, reduce the number of context refreshing packets or stop sending entirely.

Although, typically, the PDSN is receiving feedback signals from multiple MSs in its serving area, it does not need to respond to every feedback message immediately unless the BCMCS requires very stringent quality of service for every MS. For example, the PDSN can accumulate feedback messages either up to a pre-determined or variable number, or up to a pre-determined or variable time interval, and then take actions based on the group of feedback messages received.

When the negative feedback received from the MSs can distinguish between dynamic context damage or static context damage, the PDSN can have finer responding procedures. For example, if all the negative feedback indicates dynamic context loss only, the context refreshing packets need no more information than the dynamic context. Only when one or more MSs indicates static context loss, does the PDSN need to send full context information.

Thus, in a technique of header compression for broadcast/multicast services in a cellular radio network where feedback is available, various types of feedback signals can be used from the subscribing MSs to the PDSN. The technique allows the PDSN to receive positive and/or negative feedback from a single MS or group of subscribing MSs and react accordingly. An adjustable amount of context refreshing information is sent from the PDSN to the requesting MSs in an effective manner for robust header compression/decompression.

Reducing the Number of Header Compression Contexts in Push-to-Talk Type Services Another type of service supported by third generation wireless networks is Push-To-Talk (PTT) service. PTT services, where members of a PTT group can transmit data to other members of the PTT group simultaneously, transmit data packets, or data streams, that include headers. Headers in the packet streams carrying PTT data are usually compressed at the PDSN to preserve scarce radio resources. Currently, when there are multiple users in the PTT group, header compression techniques usually generate multiple header compression/decompression contexts corresponding to each user in a PTT group. In these techniques both the PDSN and the MSs maintain these multiple contexts for a single PTT session. In addition, more full headers are sent over the air every time a new context is created. An improved technique that reduces the number of header compression/decompression contexts for PTT type services in cellular radio networks is described.

The third generation wireless networks such as CDMA2000 and WCDMA networks offer PIT or other similar services such as audio/video conferences for a group of mobile users. In PTT service, a mobile user can connect to a group of other PTT users in a short interval by simply pressing a button on the MS. During the PTT session, different users take turns to speak. But at one time instant, there is usually only one user talking and broadcasting to the other members of the PTT group.

Typically, the PTT data is transported using protocols such as RTP, UDP, and IP over the packet data service options provided by the wireless networks. To efficiently utilize the scarce radio resource, packet data headers are usually compressed.

Currently, identifying a packet stream and establishing a context for it involves checking a number of header fields, including source and destination addresses, as well as source and destination port numbers. Applying these types of classification rules in PTT packet streams can result in inefficiencies. For example, in each PTT session, although the destination address and the destination port number always remain the same, the source address and the source port number do not necessarily stay constant. Different MSs in the same PTT group uses different source addresses and usually different source port numbers. The PDSN, based on the current packet stream classification rules, establishes multiple contexts for the same PTT session. Even when a mobile user only talks for a very brief moment, a new context needs to be established at all the PDSNs serving the PTT group and all the MSs belonging to the PTT group. In addition, each time a new context is established, one or more full headers need to be sent over the broadcast channel to all listening MSs, leading to inefficient bandwidth usage. In addition, because only one user is talking at any time instant, all contexts created for the PTT group, except one, are unused and only taking up resources in the PDSNs and the MSs.

Typically, in header compression implementations used in PTT services the contexts in the compressor and the decompressor are maintained as a circularly linked list. The list size may be fixed or variable but with an upper limit on size. Whenever a new context needs to be created, an unused list item, or the oldest list item at the end of the list, will be initialized to contain the new context. In some ways this helps to alleviate the multiple contexts problem for PTT service because the context created for a user that has not been speaking for a long time will be automatically recycled for other new contexts. However, limitations still exists because, if the active speaking user changes frequently in a PTT session, which is often the case, most of the contexts created for a single PTT session will take up positions in the beginning part of the list and occupy precious resources that could be used for other packet streams.

Improvements over the existing techniques can be achieved to reduce the number of header compression contexts for PTT service, if the PDSN first distinguishes packet streams sent to a unicast destination address and packet streams sent to a multicast destination address. When the destination address is a unicast address, the PDSN uses the conventional packet stream classification rules and establishes contexts based on both the source and destination addresses and other interested fields.

When the destination address is a multicast address, the PDSN classifies the packet streams based only on the destination address, destination port number, and other static fields including IP version and IP protocol field. In this technique, only one context is established for each PTT session at the PDSN and consequently at each participating MS. In addition, when the active speaking user changes, there is no need to reinitiate the context by sending all the header fields. Only the dynamic context and a number of fields that were classified as static in the conventional header compression schemes need to be updated. For example, in RTP/UDP/IP packet streams, the static fields requiring update include the source IP address, the source UDP port and the SSRC field in the RTP header. Maintaining one context only requires the addition of the source address, the source port number, and the SSRC in the updates.

Figure 9:
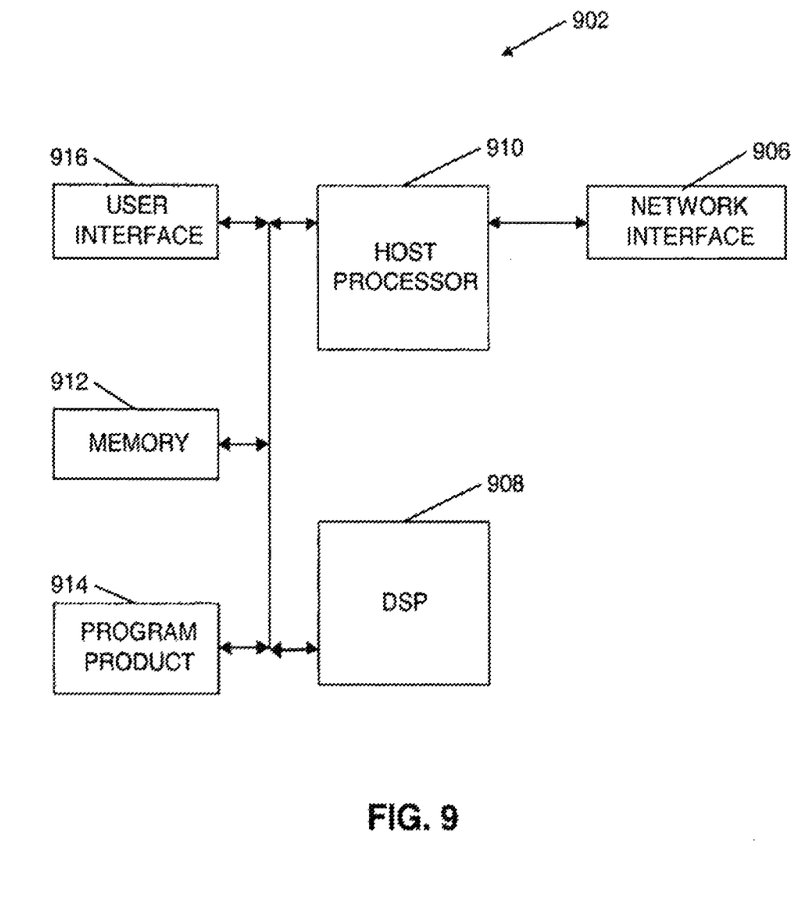
FIG. 9 is a block diagram of a wireless communication device constructed in accordance with an exemplary embodiment of the present invention.

FIG. 9 is a block diagram of a wireless communication device constructed in accordance with an exemplary embodiment of the present invention. The communication device 902 includes a network interface 906, digital signal processor (DSP) 908, a host processor 910, a memory device 912, a program product 914, and a user interface 916.

Signals from the infrastructure are received by the network interface 906 and sent to the host processor 910. The host processor 910 receives the signals and, depending on the content of the signal, responds with appropriate actions. For example, the host processor 910 may decompress the received signal itself, or it may route the received signal to the DSP 908 for decompression. The host processor 910 may also receive compressed signals from the DSP 908 and route these signals, unmodified, to the network interface 906 for transmission to the infrastructure. Alternatively, the host processor 910 may intercept the DSP 908 output and compress the data packets, and then route the compressed data packets to the network interface 906 for transmission to the infrastructure.

In one embodiment, the network interface 906 may be a transceiver and an antenna to interface to the infrastructure over a wireless channel. In another embodiment, the network interface 906 may be a network interface card used to interface to the infrastructure over landlines.

Both the host processor 910 and the DSP 908 are connected to a memory device 912. The memory device 912 may be used to store data during operation of the WCD, as well as store program code that will be executed by the host processor 910 or the DSP 908. For example, the host processor, DSP, or both, may operate under the control of programming instructions that are temporarily stored in the memory device 912. The host processor and DSP also can include program storage memory of their own. When the programming instructions are executed, the host processor 910 or DSP 908, or both, perform their functions, for example compression or decompression of data packets. Thus, the programming steps implement the functionality of the respective host processor or CPU, and DSP, so that the host processor and DSP can each be made to perform the functions of compressor and decompressor as desired. The programming steps may be received from a program product 914. The program product 914 may store, and transfer the programming steps into the memory 912 for execution by the host processor, CPU, or both.

The program product 914 may be semiconductor memory chips, such as RAM memory, flash memory, ROM memory, EPROM memory, EEPROM memory, registers, as well as other storage devices such as a hard disk, a removable disk, a CD-ROM, or any other form of storage medium known in the art that may store computer readable instructions. Additionally, the program product 514 may be the source file including the program steps that is received from the network and stored into memory and is then executed. In this way, the processing steps necessary for operation in accordance with the invention may be embodied on the program product 914. In FIG. 9, the exemplary storage medium is shown coupled to the host processor such that the host processor may read information from, and write information to, the storage medium. Alternatively, the storage medium may be integral to the host processor.

The user interface 916 is connected to both the host processor 910 and the DSP 908. For example, the user interface may include a keypad, or special function keys or buttons, that are routed to the host processor 910 and may be used by a user to request specific operation by the initiating device. For example, the user may use the keypad to dial a phone number, or to indicate that the user wants to initiate a special operational mode, such as to receive BCMCS services, or enter into PPT operation. The user interface 916 may also include a speaker that is connected to the DSP 910 and used to output audio data to the user.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of compressing multicast wireless communications between a group of users, the method comprising:
determining that a destination address in a data stream is a multicast address, wherein each data packet in the data stream comprises first parameters and second parameters, and wherein the second parameters identify a user in the group of users;
classifying the data stream based on the first parameters within the data stream;
establishing a single compressor context for use on each data packet in the data stream transmitted in a multicast session based on the classification, wherein the single compressor context comprises the first parameters; and
updating values of the second parameters, and not values of the first parameters, when an active speaking user in the group of users changes such that the single compressor context continues to be used on each data packet in the data stream when the active speaking user in the group of users changes.

2. The method of claim 1, wherein classifying the data stream comprises classifying the data stream based on the destination address.

3. The method of claim 1, wherein classifying the data stream comprises classifying the data stream based on a destination port.

4. The method of claim 1, wherein classifying the data stream comprises classifying the data stream based on an IP version.

5. The method of claim 1, wherein classifying the data stream comprises classifying the data stream based on an IP protocol field.

6. The method of claim 1, wherein the multicast session is a Push-To-Talk session.

7. The method of claim 1, further comprising compressing data packets sent to the group of users based on the single compressor context.

8. The method of claim 1, further comprising decompressing data packets received from a user in the group of users based on the single compressor context.

9. An apparatus for compressing multicast wireless communications between a group of users, the apparatus comprising:
a memory; and
a processor for executing a set of instructions stored in the memory, the set of instructions for:
determining that a destination address in a data stream is a multicast address, wherein each data packet in the data stream comprises first parameters and second parameters, and wherein the second parameters identify a user in the group of users;
classifying the data stream based on the first parameters within the data stream;
establishing a single compressor context for use on each data packet in the data stream transmitted in a multicast session based on the classification, wherein the single compressor context comprises the first parameters; and
updating values of the second parameters, and not values of the first parameters, when an active speaking user in the group of users changes such that the single compressor context continues to be used on each data packet in the data stream when the active speaking user in the group of users changes.

10. The apparatus of claim 9, wherein the classification of the data stream is based on the destination address.

11. The apparatus of claim 9, wherein the classification of the data stream is based on a destination port.

12. The apparatus of claim 9, wherein the classification of the data stream is based on an IP version.

13. The apparatus of claim 9, wherein the classification of the data stream is based on an IP protocol field.

14. The apparatus of claim 9, wherein the multicast session is a Push-To-Talk session.

15. The apparatus of claim 9, further comprising a compressor configured to compress data packets sent to the group of users based on the single compressor context.

16. The apparatus of claim 9, further comprising a decompressor configured to decompress data packets received from a user in the group of users based on the single compressor context.

17. A non-transitory storage medium including a processor, and processor-executable instructions encoded thereon for performing a method for compressing wireless communications between a group of users, the method comprising: determining that a destination address in a data stream is a multicast address, wherein each data packet in the data stream comprises first parameters and second parameters, and wherein the second parameters identify a user in the group of users; classifying the data stream based on the first parameters within the data stream; establishing a single compressor context for use on each data packet in the data stream transmitted in a multicast session based on the classification, wherein the single compressor context comprises the first parameters and updating values of the second parameters, and not values of the first parameters when an active speaking user in the group of users changes such that the single compressor context continues to be used on each data packet in the data stream when the active speaking user in the group of users changes.

18. An apparatus for compressing multicast wireless communications between a group of users, the apparatus comprising:
means for determining that a destination address in a data stream is a multicast address, wherein each data packet in the data stream comprises first parameters and second parameters, and wherein the second parameters identify a user in the group of users;
means for classifying the data stream based on the first parameters within the data stream;
means for establishing a single compressor context for use on each data packet in the data stream transmitted in a multicast session based on the classification, wherein the single compressor context comprises the first parameters; and
means for updating values of the second parameters, and not values of the first parameters, when an active speaking user in the group of users changes such that the single compressor context continues to be used on each data packet in the data stream when the active speaking user in the group of users changes.

19. The non-transitory storage medium of claim 17, wherein the classification of the data stream is based on the destination address.

20. The non-transitory storage medium of claim 17, wherein the classification of the data stream is based on a destination port.

21. The non-transitory storage medium of claim 17, wherein the classification of the data stream is based on an IP version.

22. The non-transitory storage medium of claim 17, wherein the classification of the data stream is based on an IP protocol field.

23. The non-transitory storage medium of claim 17, wherein the multicast session is a Push-To-Talk session.

24. The non-transitory storage medium of claim 17, wherein the method further comprises compressing data packets sent to the group of users based on the single compressor context.

25. The non-transitory storage medium of claim 17, wherein the method further comprises decompressing data packets received from a user in the group of users based on the single compressor context.

26. The apparatus of claim 18, wherein means for classifying comprises means for classifying the data stream based on the destination address.

27. The apparatus of claim 18, wherein means for classifying comprises means for classifying the data stream based on a destination port.

28. The apparatus of claim 18, wherein means for classifying comprises means for classifying the data stream based on an IP version.

29. The apparatus of claim 18, wherein means for classifying comprises means for classifying the data stream based on an IP protocol field.

30. The apparatus of claim 18, wherein the multicast session is a Push-To-Talk session.

31. The apparatus of claim 18, further comprising means for compressing data packets sent to the group of users based on the single compressor context.

32. The apparatus of claim 18, further comprising means for decompressing data packets received from a user in the group of users based on the single compressor context.

* * * * *